United States Patent
Karlsson et al.

[11] Patent Number: 5,971,018
[45] Date of Patent: Oct. 26, 1999

[54] VALVE DEVICE FOR INFLUENCING AN OVERPRESSURIZED FLOW OF MEDIA

[75] Inventors: Per Karlsson, Hällestad; Lennart Persson, Finspång, both of Sweden

[73] Assignee: ABB Stal AB, Finspang, Sweden

[21] Appl. No.: 08/945,349

[22] PCT Filed: Apr. 24, 1996

[86] PCT No.: PCT/SE96/00545

§ 371 Date: Jan. 16, 1998

§ 102(e) Date: Jan. 16, 1998

[87] PCT Pub. No.: WO96/34219

PCT Pub. Date: Oct. 31, 1996

[30] Foreign Application Priority Data

Apr. 26, 1995 [SE] Sweden .................................. 9501539

[51] Int. Cl.[6] ....................................................... F16K 1/44
[52] U.S. Cl. ....................................... 137/613; 137/637.2
[58] Field of Search ..................................... 137/637, 613, 137/637.2; 251/28, 29, 25

[56] References Cited

U.S. PATENT DOCUMENTS 4,041,979  8/1977  Grotloh ............................. 137/637.2 X
4,856,551  8/1989  Bräkelmann ..................... 137/637.2 X

FOREIGN PATENT DOCUMENTS

B-366 803   5/1982   Austria .
A-2 523 297  11/1976  Germany .
A-2 533 519  3/1977   Germany .
B-411 636   of 1980  Sweden .

Primary Examiner—Kevin Lee
Attorney, Agent, or Firm—Pollock, Vande Sande & Amernick

[57] ABSTRACT

A valve device for influencing an overpressurized flow of media comprises a control valve for controlling the flow of media, and a closing valve which is either totally open or totally closed to stop the flow. The valves are arranged in a common valve housing and can seal independently of each other against a common valve seat. The valve seat presents an outlet side which forms the outlet channel of the valve device. The valve device can be made compact, and the number of necessary redirections of the flow of media is minimized.

14 Claims, 4 Drawing Sheets

VALVE DEVICE FOR INFLUENCING AN OVERPRESSURIZED FLOW OF MEDIA

FIELD OF THE INVENTION

The present invention relates to a valve device for influencing an overpressurized flow of media, comprising a control valve and a closing valve, arranged in a common valve housing, forming a channel portion and having an outlet channel and an inlet channel, and a common valve seat arranged in the valve housing and having an inlet side and an outlet side. The control valve arranged to control the flow through the channel portion, and the closing valve is arranged to take either a generally closed position or a generally open position. One of the valves comprises a first cone body which is displaceable towards the valve seat, and the other valve comprises a second cone body, displaceable towards the valve seat and designed to be able to bear against the valve seat outside the first cone body, independently of the position of the first cone body.

BACKGROUND OF THE INVENTION

To control the steam flow to a steam turbine, for instance, or steam reduction conducts, a control valve which opens and throttles the steam flow is required for controlling the rotation speed of the steam turbine, and a fast-closing valve which, during control errors or some other, outer fault, can be moved from a totally open to a totally closed position within a very short space of time, in the order of 0.2 s, to completely stop the steam flow is required. The fast-closing valve and the control valve are controlled independently of each other, that is the fast-closing valve must be able to close independently of the position of the control valve.

According to the prior art, these valves can be arranged in respective valve housing in a steam flow channel, the fast-closing valve being arranged upstream of the control valve. The valve housing of the fast-closing valve as well as the valve housing of the control valve form a perpendicular bend of the steam flow channel, that is the flow is redirected twice by 90°. A steam sieve is concentrically arranged around the fast-closing valve. The steam sieve has as its task to sieve the steam and to separate particles that could damage the turbine. This construction has the following drawbacks. Firstly, the structure becomes costly as it requires two valve housings. These two valve housings are also space-requiring and, accordingly, occupy a lot of space around the turbine. Furthermore, the double redirection of the steam flow leads to an important drop of pressure flow losses and a high noise level.

SE-B-411 636 shows a combined fast-closing and control valve for steam turbine arrangements. The fast-closing and control valve bodies are arranged in a common housing and, by means of a respective actuator, are controllable independently of each other through respective spindles. Furthermore, they are arranged to be displaceable towards coaxial, adjacent sealing surfaces of a common valve seat. The fast-closing valve body is designed as a bell into the inner room of which the control valve body projects coaxially. Also according to this solution the steam flow must be redirected twice by 90°. Thereby, the fast-closing valve body projects into the flow path and is brought downwards from above, towards the valve seat during closure. The control valve body is rigidly connected to a spindle which extends up and through the valve seat, that is it runs in the flow path. Also in this solution important flow losses are obtained as the flow is twice redirected. Furthermore, the flow losses become important due to the fact that the control valve body extends upwards through the valve seat. To compensate for the area occupied by the spindle of the control valve body, the passage opening of the valve seat must be enlarged. Furthermore, the structure requires large amount of space as the actuators of the valves are located at a respective side of the valve housing.

DE-A-2 533 519 shows another type of valve for steam turbines, with an inlet chamber and an outlet chamber for the steam flow and a common valve housing comprising a fast-closing valve, an outblow valve connected thereto and a control valve, the valve bodies of which are coaxially arranged. This valve presents an actuator with a spindle belonging thereto for the fast-closing valve and the outblow valve. As the fast-closing valve is opened the outblow valve is closed and vice versa. Furthermore, the valve body of the fast-closing valve is arranged to be inserted in an inner spacing of the control valve designed as a bell. This structure also redirects the steam flow twice by 90° and presents a very unfavorable design for the steam flow. Furthermore, the control spindle of a valve body extends through the valve seat and, thus, through the steam flow. Therefore, also in this structure, important flow losses and an important fall in pressure are obtained. Furthermore, the structure is space-demanding due to the two actuators and the complicated design of the housing.

DE-A-2 523 297 shows a combined fast-closing and control valve for steam turbines, the valve bodies of which are coaxially arranged in a common valve housing. The valve bodies act from respective sides of a common valve seat and are controlled independently of each other by means of respective actuators with a spindle belonging thereto for the control valve, and a further actuator through a respective spindle. Also in this case the flow is redirected twice by 90°, so that the flow losses become important, and the actuators of the valves are arranged on respective sides of the valve housing, which requires space.

SUMMARY OF THE INVENTION

The object of the present invention is, therefore, to remedy the above drawbacks and provide a valve device with a structure that is compact, favorable from a cost perspective and has improved flow properties.

This object is obtained by means of the valve device initially mentioned, which is characterized in that the outlet side of the valve seat forms the outlet channel of the valve housing, which outlet channel extends freely from the cone bodies. As the outlet side of the valve seat forms the outlet channel of the valve housing, the flow of media does not need to be redirected after the passage of the valve seat, something that leads to low flow losses and a lower noise level. This also has the advantage that the design of the valve housing can be made relatively simple and compact.

Advantageously, the valve device presents first means to control the control valve and second means to control the closing valve. According to a first embodiment these means are arranged so that they extend in the same direction away from the inlet side of the valve seat and, accordingly, are located totally outside the outlet side. Hereby, a free streaming of the flow media through the valve seat is accomplished without the streaming being negatively affected by inward-projecting valve spindles and the like. According to another embodiment, the second control means are arranged to control the closing valve by means of the overpressure of the flow of media. By such a design of the control means, no actuator with a spindle is required to control the closing valve. By this, important space is spared.

According to another embodiment, the outlet channel and the inlet channel form an angle to each other in such a way that the flow through the valve housing is redirected just once. This implies that the flow losses are kept low and that the noise level also can be kept at a low level. Simultaneously this also makes a simple and compact design of the valve housing possible.

According to yet another embodiment, the first cone body forms the cone body of the control valve, and the second cone body forms the cone body of the closing valve, which cone body, accordingly, is located upstream of the control valve.

Advantageously, the second control means comprise a channel member which opens in the channel portion upstream of the closing valve and which extends to a spacing into which the closing valve is at least partly projected when being in the open position. By using such a channel member the overpressure of the flow of media can be accomplished behind the closing valve and be used for the closure of the latter. Advantageously, a first pilot valve is arranged in the channel member and, in a first position, opens the connection between the spacing and the channel portion, to establish the overpressure in the spacing and accomplish the closure of the closing valve, and, in a second position, closes the connection between the spacing and the channel portion and opens a connection between the spacing and a low-pressure point, to eliminate the overpressure in the spacing and accomplish the opening of the closing valve.

According to one embodiment this control of the closing valve is made possible due to the fact that the valve device presents a center axis around which the first cone body and the second cone body are arranged, and the area of the second cone body in the spacing, as projected onto a plane in relation to which this axis forms a normal, is larger than the free area of the second cone body in the channel portion, as projected onto this plane, at least when the cone body is in the closed position. Hereby, a force applied by the overpressure upon the cone body of the closing valve will be larger in a closing direction than in an opening direction. To increase the closing force upon the closing valve, a spring, advantageously, may be located in the spacing and act upon the second cone body. According to another embodiment, this control of the closing valve is made possible due to the fact that the valve device presents a center axis around which the first cone body and the second cone body are arranged, and that the second cone body has a stair-like design so that the area of the second cone body in the spacing, as projected on the plane in relation to which this axis forms a normal, is substantially larger than the free area of the second cone body in the channel portion, as projected onto this plane. By such a design of the second cone body, a sufficiently large closing force can be assured without a spring arranged in the spacing.

According to another embodiment, the second cone body is ring-shaped and encloses an inner spacing into which the first cone body is inserted in such a way that it is enclosed by the second cone body. By such a design of the cone body, a compact valve structure is obtained. Preferably, the second, ring-shaped cone body is formed by a ring-shaped sleeve without a bottom, and the spacing into which the second cone body is projectable is also ring-shaped. This further increases the compactness of the valve.

According to another embodiment, a channel is arranged in the wall of the ring-shaped, second cone body in such that it establishes a connection between the channel portion upstream of the closing valve and the inner spacing of the closing valve when the closing valve is in the closed position, to create the overpressure in the inner spacing when the control valve is closed and thereby permit the opening of the closing valve. By this, it is assured that the closing valve can only can be opened when the control valve is closed. This is important from a safety point of view. Advantageously, a second pilot valve is arranged in the channel to open the channel when the ring-shaped spacing is connected to the low pressure point, and to close the channel when the ring-shaped spacing is connected to the channel portion. In this way the channel is opened only when one wishes to open the closing valve. Thereby, it is avoided that the flow of media continuously streams through the channel and gives rise to losses and noise.

According to another embodiment, the first control means comprise a spindle surrounded by the ring-shaped spacing. In that way the whole control valve is arranged inside the closing valve, something that makes the valve device compact.

According to another embodiment, a steam sieve is arranged around the valve cone bodies. The sieve presents guiding members to guide the flow of media towards the inlet side of the valve seat. Such a steam sieve improves the flow through the valve house and the valve seat, something that improves the control or the flow of media with the control valve and decreases the noise from the valve device.

BRIEF DESCRIPTION OF THE DRAWINGS

The invention will now be described more in detail by means of different embodiments shown in the figures.

DETAILED DESCRIPTION OF THE PREFERRED EMBODIMENTS

Figure 1:
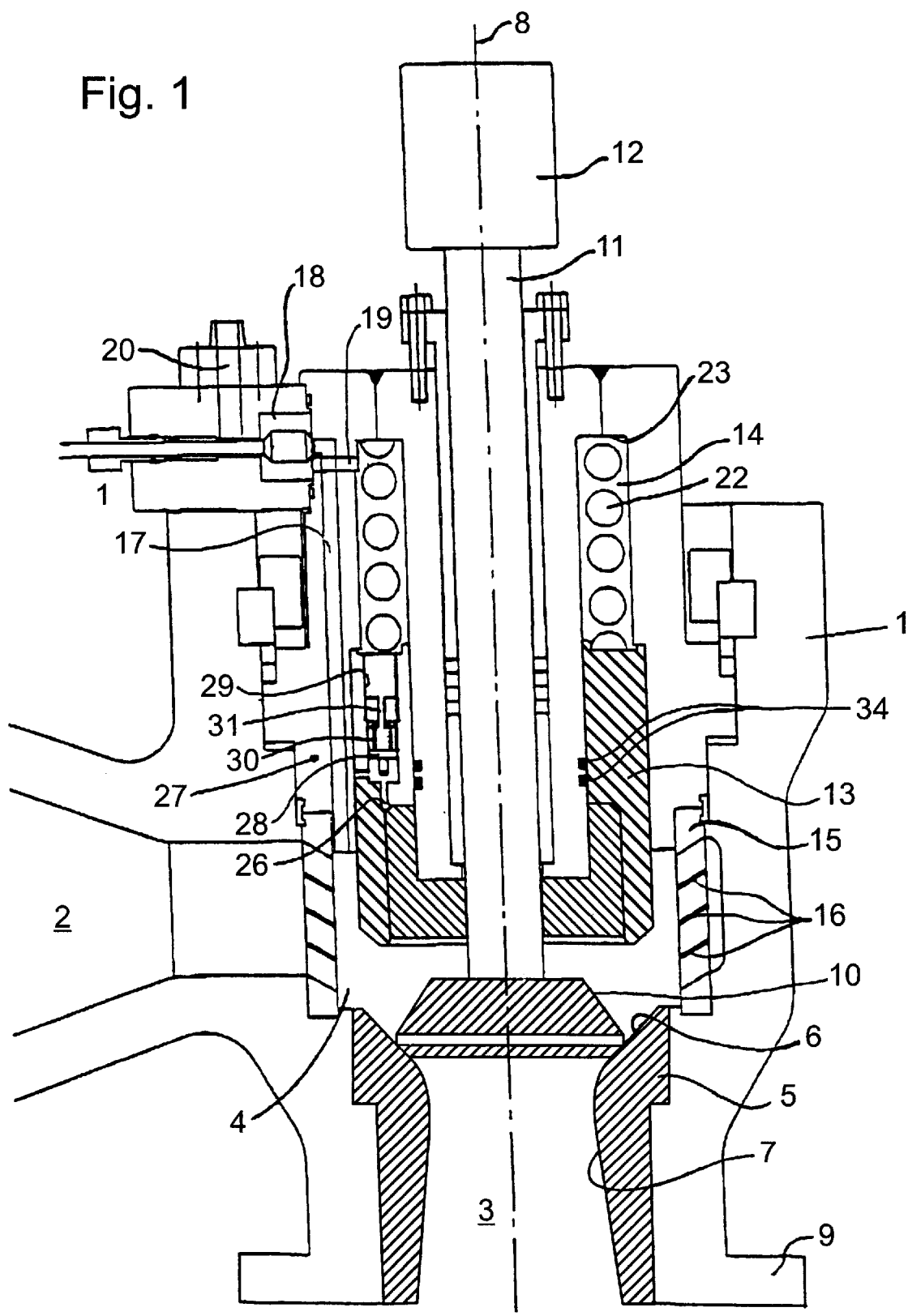
FIG. 1 shows a section through a valve device with a fast-closing valve that is open.
Figure 2:
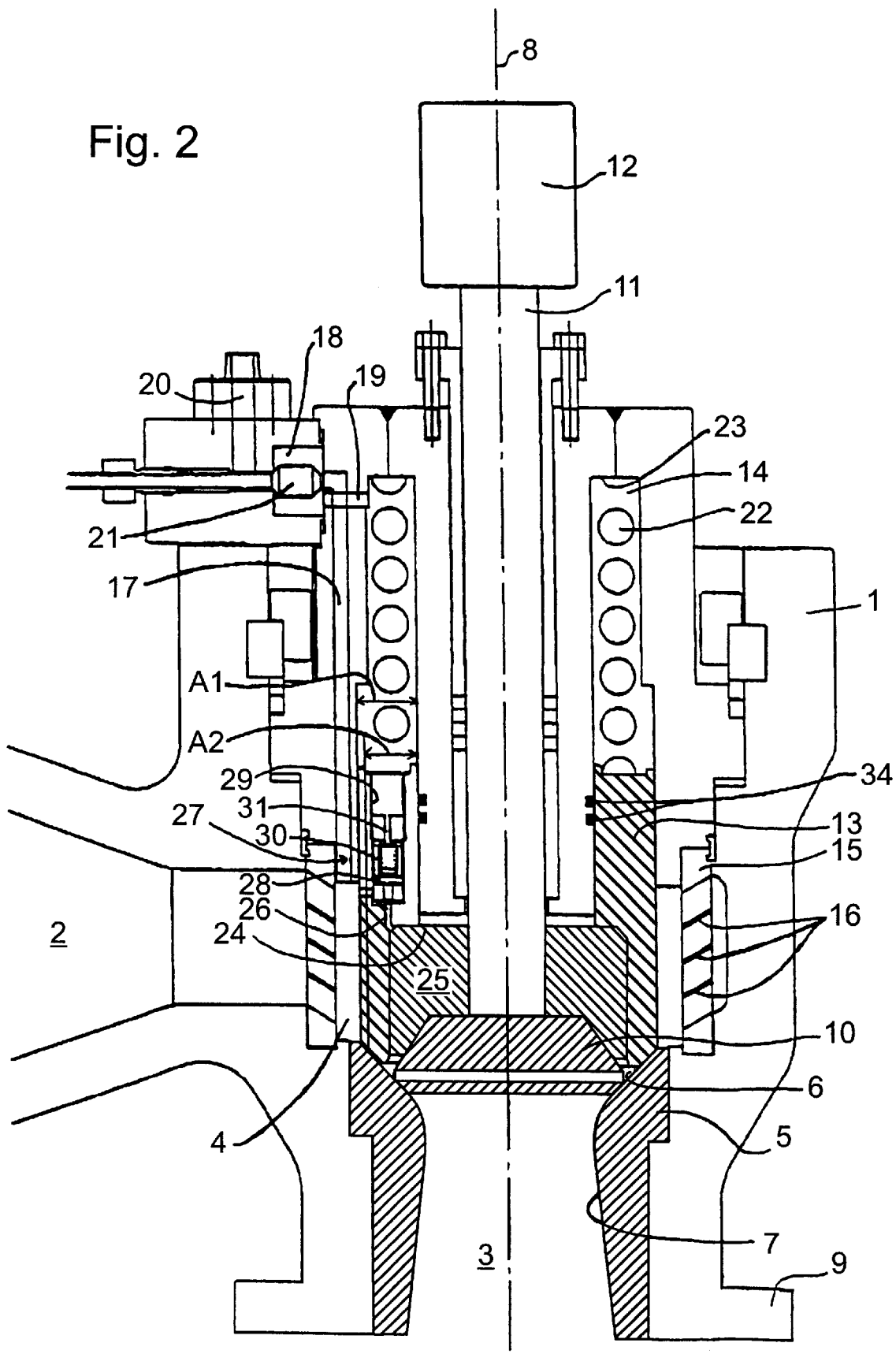
FIG. 2 shows a section through the valve device, with closed fast-closing valve.

FIGS. 1 and 2 show a valve device for control and closure of steam flow to, for instance, steam turbines or steam reduction conducts. The valve device comprises a valve housing 1 with an inlet channel 2, an outlet channel 3 and a channel portion 4 located between these channels 2, 3. The valve housing 1 further comprises a valve seat 5 with an inlet side 6 and an outlet side 7. The valve seat 5, presenting a concentric center axis 8, is arranged in the outlet channel 3 of the valve housing 1 in such a way that the outlet side 7 of the valve seat 5 forms the outlet channel 3 of the valve housing 1. At the downstream side the outlet channel 3 is designed to permit it to be attached directly, for instance by means of a flange 9, to the next device in the steam flow process, for instance a steam turbine. Thereby, the steam flow can stream along a straight line from the inlet side 6 of the valve seat 5 straight into a steam turbine, for instance, without need to be redirected.

The valve device has a control valve, arranged in the valve housing 1 and comprising a control valve cone body 10 and a spindle 11 connected thereto. At its other end, located outside the valve housing 1, the spindle 11 is connected to an actuator, not shown, through a coupling 12. By means of the actuator the control valve is displaceable along the center axis 8 towards and away from the inlet side 6 of the valve housing 5.

The valve device further presents a closing valve arranged in the valve housing 1 and comprising a valve cone body 13 which is designed as a ring-shaped bottomless sleeve. In the embodiment shown, the closing valve forms a so called fast-closing valve which, during control errors or some other outer fault, closes very fast, that is within approximately 0.2 s, and can shut off the steam flow to emergency stop the steam turbine for example. The ring-shaped valve cone body 13 presents a center axis coinciding with the center axis 8 and is displaceably arranged in a ring-shaped spacing 14 towards and away from the inlet side 6 of the valve seat 5. The ring-shaped valve cone body 13 bears on the valve seat 5 around and outside the control valve cone body 10, see FIG. 2. The ring-shaped valve cone body 13 thus stops the steam flow upstream of the control valve cone body 10.

The valve device further has a ring-shaped steam sieve 15 which preferably is concentrically arranged outside the ring-shaped valve cone body 13. The steam sieve 15 presents guiding beams 16 which guide the steam flow from the inlet channel 2 in direction towards the inlet side 6 of the valve seat 5.

From the channel portion 4 a channel 17 extends to a pilot valve 18, and from the pilot valve 18 a channel 19 extends, on one hand, to the ring-shaped space 14, and, on the other hand, a channel 20 extends to connect the pilot valve 18 with a low-pressure point, for instance downstream of a steam turbine. The pilot valve 18 comprises a valve cone body 21 which, in a first end position, closes the channel 20 and opens the channel 17 and, in a second end position, opens the channel 20 and closes the channel 17. Accordingly, in the first end position, the channel portion 4 is in connection with the ring-shaped spacing 14 so that the same high-pressure which exists in the channel portion 4 will also exist in the ring-shaped spacing 14. In the second end position of the valve cone body 21, the ring-shaped spacing 14 is in connection with the low-pressure point, so that a pressure which is substantially lower in comparison with the pressure in the channel portion 4 exists in the ring-shaped spacing 14.

In the example shown the pilot valve 18 is arranged on the valve housing 1 of the valve device. However, it may also be arranged at a distance from the valve device and be connected to the ring-shaped spacing 14 and the channel portion 4 by means of pressure conducts, see FIG. 4. Furthermore, in the shown example the channel 17 opens in the channel portion 4 inside of the steam sieve 15, whereby it is assured that no dirt particles can penetrate into the pilot valve 18 or the ring-shaped spacing 14. However, it is also possible to connect the channel 17 upstream of the steam sieve 15, for instance in order to save space in the valve house 1.

The ring-shaped valve cone body 13 presents a first free area A1 in the ring-shaped spacing 14, as projected on a plane in relation to which the center axis 8 forms a normal, and a second free area A2 in the channel portion 4, as projected on the plane, when the ring-shaped valve cone body 13 is in its closed position. The first free area A1 is larger than the second free area A2. Thereby, it is assured that the ring-shaped valve cone body cannot go from closed position to open position as long as the valve cone body 21 is in the first end position. Furthermore, a compression spring 22 is arranged in the ring-shaped spacing 14 between an upper limitation wall 23 and the ring-shaped valve cone body 13. The spring force of the compression spring 22 acts upon the ring-shaped valve cone body 13 in closing direction. When the ring-shaped valve cone body is in the open position, the free area in the channel portion 4, as projected on the plane, is just as large as the first free area A1.

Accordingly, the force that is exerted by the pressure in the channel portion 4 upon the free area of the ring-shaped valve cone body 13 in the channel portion 4 will be larger than the spring force and, as the pressure is substantially lower in the ring-shaped spacing 14 than in the channel portion 4 when the ring shaped valve cone body 13 is in its open position and the pilot valve 18 is in the second end position, this force is sufficient to counteract the closure of the ring-shaped valve cone body 13.

The ring-shaped, sleeve-like valve cone body 13 encloses, together with an upper limitation wall 24 of the channel portion 4, an inner spacing 25, at least in its closed position. The control valve cone body 10 can be accommodated in this inner spacing 25, that is the ring-shaped valve cone body 13 can be closed independently of the position of the control valve cone body 10. When also the control valve cone body 10 is in its closed position, the inner spacing 25 is completely closed from the inlet channel 2 and the outlet channel 3, as seen in FIG. 2. To be able to open the ring-shaped valve cone body 13, a pressure must thus be created in the inner spacing 25, which pressure is large enough, by the second free area A2 of the ring-shaped valve cone body 13, which area is accessible from the inner spacing 25, to overcome the spring force of the spring 22. Thereto, the channel 26 is arranged in the wall of the ring-shaped valve cone body 13. Thereby, the same pressure can exist in the inner spacing 25 and the inlet channel 2. Due to the small cross-section of the channel 26 the control valve cone body 10 must be in a closed position to permit such a pressure equalizing to take place. This is an important safety aspect at steam turbine plans for instance. In its most simple embodiment, the channel 26 is only formed by a hole which extends through the wall of the ring-shaped valve cone body 13 and which is at such a height that it is situated in the channel portion 4 when the ring-shaped valve cone body 13 is closed, and is hidden in the ring-shaped spacing 14 when the ring-shaped valve cone body 13 is open. To avoid leakage through the channel 26, a second pilot valve 27 can be arranged in the ring-shaped valve cone body 13. The second pilot valve 27 presents a valve cone body 28 which is displaceably arranged in a recess 29 extending parallel to the center axis 8. The channel 26 presents an inlet part which connects the recess 29 with the channel portion 4, and an outlet part which connects the recess 29 with the inner spacing 25. The valve cone body 28 can be prestressed by means of a spring 30 towards a valve seat, arranged in the recess 29, for closing the channel 26. Furthermore, the valve cone body 28 of the second pilot valve 27 is, through a passage 31, connected to the ring-shaped spacing 14, so that the valve cone body 28 is pressed against the valve seat when a high-pressure exists in the ring-shaped spacing 14. Furthermore, the valve cone body 28 presents a piston-like part which bears on the wall of the recess 29 and a part which projects from the piston-like part and is to seal against the valve seat of the recess 29. Thereby, the spacing is formed in the recess 29 when the second pilot valve 27 is closed, in which spacing the inlet part of the channel 26 opens.

As the ring-shaped cone body 13 is in closed position, the same pressure is present in the inlet channel 2 and in the ring-shaped spacing 14 and in the spacing of the recess 29. Thereby, the valve cone body of the second pilot valve 27 is designed in such a way that the area accessible for the high-pressure from above, that is from the ring-shaped spacing, is larger than the area accessible from below, that is from the spacing of the recess 29. Thereby, the pressure of the steam flow will act upon the valve cone body of the second pilot valve 27 in closing direction. This closing action can be amplified by means of the spring 30. When the pilot valve 18 is brought from the first end position to the second end position, the overpressure in the ring-shaped spacing 14 disappears. Thus, the overpressure in the spacing of the recess 29 will displace the valve cone body 28 to an open position, by overcoming the force of the spring 30. Therefore, if the control valve 10 is closed, the pressure can only be built up in the inner spacing 25 through the channel 26. When this pressure has been built up it will act upon the free area A2 and push the ring-shaped valve cone body 13 into the ring-shaped spacing 14 and, thus, open the closing valve 13.

Figure 3:
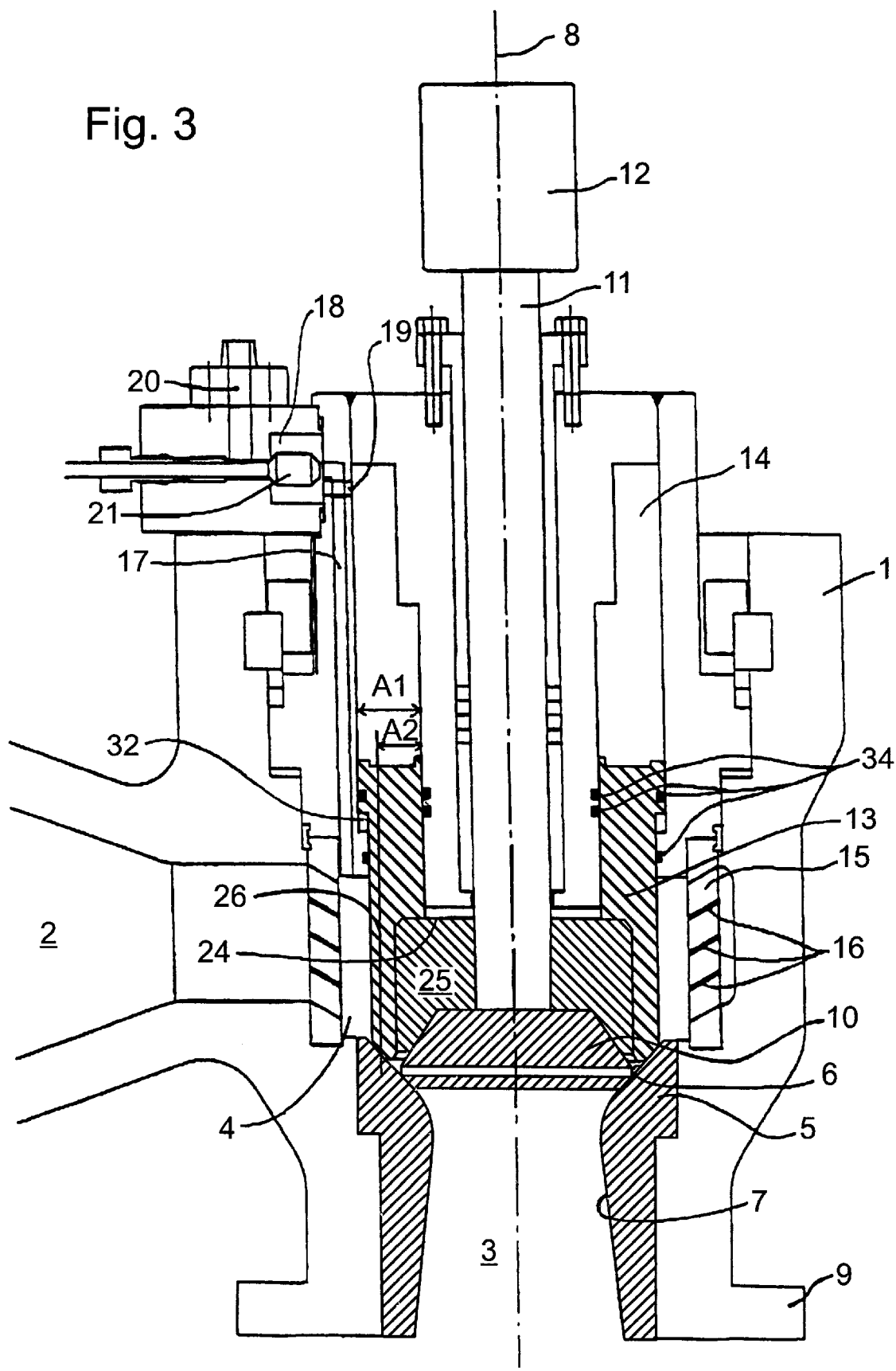
FIG. 3 shows a section through a valve device according to another embodiment.

In the embodiment shown in FIG. 3 the compression spring 22 has been excluded. Instead, the ring-shaped valve cone body has a stair-like design, so that the free area A1 is substantially larger than the free area A2. Thereby, the pressure will always act in a closing direction when the pilot valve 18 is in the first end position and the same pressure is present in the channel portion 4 and the ring-shaped spacing 14. Due to the stair-like design, a closed spacing 32 is created between the wall of the ring-shaped spacing 14 and the wall of the ring-shaped cone body 13. This closed spacing 32 is, by means of a channel, not shown, connected to the low-pressure point to stop a pressure possibly built up in the closed spacing from being able to prevent the closure of the ring-shaped valve cone body 13. Furthermore, the channel 26 is shown without a second pilot valve. However, it is possible to arrange one in the same way as in the first embodiment.

In the embodiment according to FIG. 3 the pressure upon the area A1, which is the substantially larger in comparison to the free area A2, will thus act in a closing direction when the pilot valve 18 is in the first end position. As the pilot valve 18 is displaced to the second end position and the high-pressure in the ring-shaped spacing 14 disappears, the area accessible from the channel portion 4 is sufficient to open the closing valve 13 and keep it open.

Figure 4:
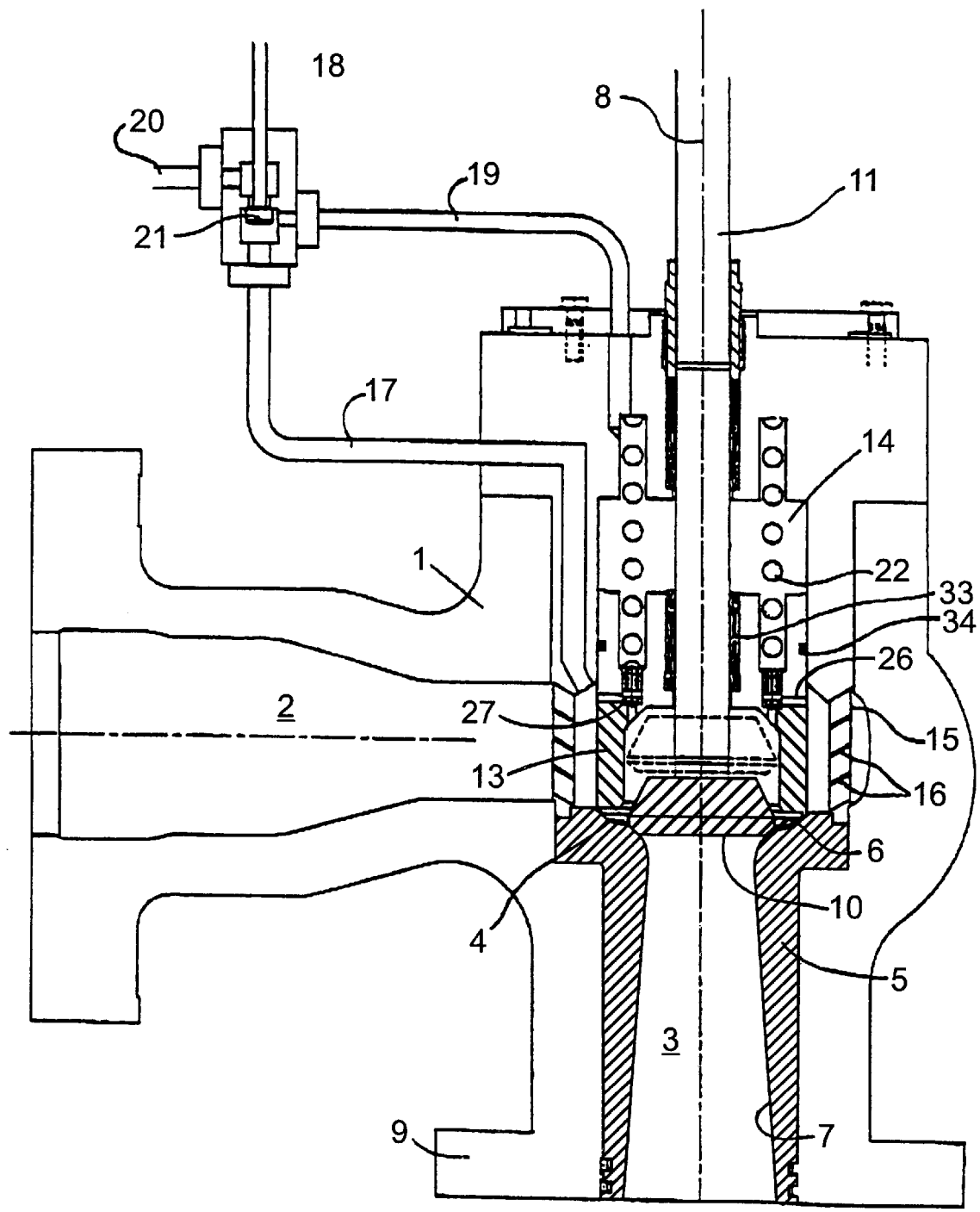
FIG. 4 shows a section through a valve device according to yet another embodiment.

FIG. 4 shows a further embodiment which differs from the other embodiments through the pilot valve 18 being arranged at a distance from the valve housing 1 and the ring-shaped valve cone body 13 being displaceably arranged directly on the spindle 11 of the control valve cone body 10, the ring-shaped spacing 14 being formed between the valve housing 1 and the spindle 11. To guide the ring-shaped valve cone body 13 on the spindle 11, a bushing 33 is arranged therebetween. Furthermore, a sealing, not shown in detail, is arranged between the spindle 11 and the ring-shaped cone body 13.

In all embodiments a plurality of sealing rings 34 are arranged in the valve housing between the ring-shaped spacing 14 and the ring-shaped valve cone body 13 to prevent unintentional pressure equalizing between the ring-shaped spacing 14 and the channel portion 4.

Even if, in all the embodiments shown, the longitudinal axis of the inlet channel 2 and the longitudinal axis of the outlet channel 3 are arranged in a perpendicular angle to each other, other angles, obtuse as well as sharp ones, are possible. Particularly, the longitudinal axes of these channels may be arranged at an obtuse angle in relation to each other to further improve the flow conditions and reduce the fall of pressure.

We claim:

1. A valve device for influencing an overpressurized flow of media, comprising a control valve and a closing valve arranged in a common valve housing, forming a channel portion and having an outlet channel and an inlet channel, and a common valve seat, arranged in the valve housing and having an inlet side and an outlet side, the control valve controlling the flow through the channel portion, the closing valve having a substantially closed or a substantially open position, and in said open position, said closing valve being at least partly inserted into a spacing which via a channel member is connected to the channel portion upstream of the closing valve, the control valve comprising a first cone body, displaceable towards the valve seat, and the closing valve comprising a second cone body, displaceable towards the valve seat to bear on the valve seat outside the first cone body and independently of the position of the first cone body, the outlet side of the valve seat forming the outlet channel of the valve housing, the outlet channel extending freely from the cone bodies, first pilot valve provided in the channel member and arranged, in a first position, to open the connection between the spacing and the channel portion to establish the overpressure in the spacing and the closure of the closing valve and, in a second position, to close the connection between the spacing and the channel portion and open a connection between the spacing and a low-pressure point, to eliminate the overpressure in the spacing and accomplish the opening of the closing valve.

2. A valve device according to claim 1, further including means for controlling the control valve.

3. A valve device according to claim 2, wherein said control means and the channel members are arranged to extend in the same direction away from the inlet side of the valve seat and thereby are located totally outside the outlet side.

4. A valve device according to claim 2 wherein the channel members control the closing valve by means of the overpressure of the flow of media.

5. A valve device according to claim 1 wherein the outlet channel and the inlet channel form an angle with respect to each other whereby the flow through the valve housing is only redirected once.

6. A valve device according to claim 1 wherein the valve device has a center axis around which the first cone body and the second cone body are arranged, and the area of the second cone body in the spacing, as projected on a plane in relation to which the center axis forms a normal, is larger than the free area of the second cone body in the channel portion, as projected on the plane, at least when the second cone body is in a closed position.

7. A valve device according to claim 1 further including a spring located in the spacing, said spring effecting the second cone body in the closing direction.

8. A valve device according to claim 1 wherein the valve device has a center axis around which the first cone body and the second cone body are arranged, and the second cone body has a stair-like design which make the area of the second cone body in the spacing, as projected on a plane in relation to which the center axis forms a normal, substantially larger than the free area of the second cone body in the channel portion, as projected onto the plane.

9. a valve device according to claim 1 wherein the second cone body is ring-shaped and encloses an inner spacing, and the first cone body is insertable in the inner spacing (25) to be enclosed by the second cone body.

10. A valve device according to claim 9 wherein the second, ring-shaped cone body is formed by a ring-shaped sleeve without bottom, and the spacing into which the second cone body is insertable is ring-shaped.

11. A valve device according to claim 9, wherein a channel is arranged in the wall of the ring-shaped, second cone body to establish a connection between the channel portion upstream of the closing valve, and the inner spacing of the closing valve as the closing valve is in the closed position to establish the overpressure in the inner spacing when the control valve is closed, and thereby permit the opening of the closing valve.

12. A valve device according to claim 11, wherein a second pilot valve is arranged in the channel to open the channel when the spacing is connected to the low-pressure point, and to close the channel when the spacing is connected to the channel portion.

13. A valve device according to claim 2 characterized in wherein said control means comprise a spindle which is surrounded by the spacing.

14. A valve device according to claim 1 wherein a steam sieve is arranged around the valve cone bodies and presents guiding members to guide the flow of media towards the inlet side of the valve seat.

* * * * *